UNITED STATES PATENT OFFICE.

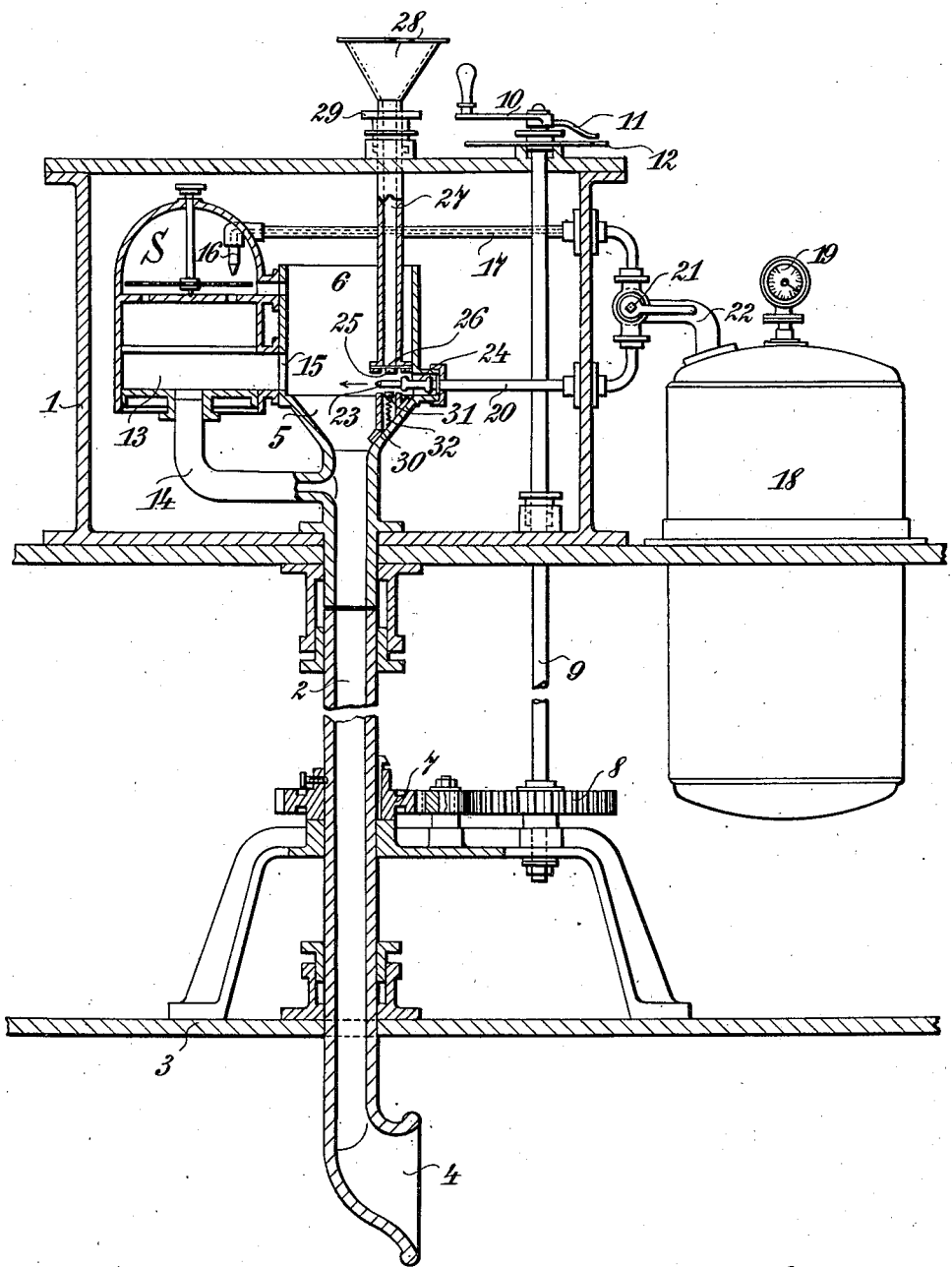

JOSEF SCHIESSLER, OF BADEN, NEAR VIENNA, AUSTRIA-HUNGARY.

TRANSMITTING APPARATUS FOR SUBMARINE SIGNALING.

1,152,661.    Specification of Letters Patent.    Patented Sept. 7, 1915.

Original application filed February 8, 1908, Serial No. 414,998. Divided and this application filed March 1, 1910. Serial No. 546,710.

*To all whom it may concern:*

Be it known that I, JOSEF SCHIESSLER, a subject of the Emperor of Austria-Hungary, residing at Baden, near Vienna, Austria-Hungary, have invented certain new and useful Improvements in Transmitting Apparatus for Submarine Signaling, and is a division of my application Serial No. 414,998, filed February 8, 1908; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a transmitting apparatus that can be used for submarine signaling and by which sound-waves generated by artificially produced sounds or spoken sounds can be imparted to and propagated under the water in such a manner as to be picked up by a suitable submarine signal receiving apparatus. For this purpose a sound producer, for instance a siren, is arranged on a resonance-box that can be adjusted to resonance and which is in such communication with a sound tube opening out under water that the air vibrations produced in the resonance box by the sound producer cause the air contained in the sound tube to oscillate in the direction of the axis of this tube, whereby the air vibrations are impressed to an increased extent on the water contained in the sound tube and the so-produced sound waves are sent out in the desired direction through an open sound-horn arranged on the lower end of the sound-tube and adjustable in any desired direction.

The accompanying drawing is a vertical section of a transmitting apparatus embodying the present invention.

Such transmitting apparatus comprises a box 1 made as sound proof as possible and through the bottom of which passes a tube 2 which, when the apparatus is arranged upon a ship extends through the ship's bottom 3, and terminates within the water in a sound horn 4 made of appropriate sea water resisting material. The upper end of the tube 2 terminates in a horn or funnel 5 to which is secured a cylindrical extension 6. The lower part of the tube 2 is capable of rotation and at a suitable distance from the ship's bottom 3 is provided with a toothed wheel 7 that gears, through intermediate gear wheels, with a toothed wheel 8 of equal size, the shaft 9 of which extends vertically through the box 1 and at its upper end is fitted with an arm 10 and a pointer 11 arranged to move over a disk 12 that is marked with division lines. When the tube 2 is rotated by means of the arm 10 the pointer 11 will always indicate the position of the sound horn 4 so that the sound horn can be readily adjusted in any desired direction.

Arranged at one side of the funnel extension 6 is a siren S or other suitable sound producer of a known kind. Such siren can be driven in an electrical or any other desired manner and is mounted upon a resonance box 13 the internal capacity of which can be altered for the purpose of enabling adjustment to resonance to be made. In like manner the actuation of the siren can be regulated for the purpose of adjusting the pitch according to desire. 14 is a branch pipe leading from the bottom of the resonance box 13 into the pipe 2, while the funnel extension 6 is placed in direct communication with the resonance box 13 by a lateral opening 15. Thus the vibrations of air, generated by the sound producer, are imparted to the air contained in the sound tube not only through the opening 15, but also through the tube 14 so that the air is caused to vibrate in the direction of the axis of the sound-tube.

Immediately above and at right angles to the revolving disk of the siren S is the discharge nozzle 16 of a tube 17 which is supplied either with compressed air at a pressure of eight to ten atmospheres or with steam from a storage reservoir 18 provided with a pressure gage 19 the arrangement being such that the air or vapor issuing from the nozzle 16 strikes upon the revolving disk of the siren. The compressed air or steam in the storage reservoir 18 may be also conducted, for the purpose hereinafter set forth, into a second tube 20 for which purpose a cock 21 is inserted at the junction of the two tubes 17 and 20 with the outlet branch 22 of the compressed air or vapor reservoir, and the plug of which cock, when in the middle position as shown in the drawing shuts off both tubes 17 and 20, while when in one extreme position it only opens the tube 17 and in the other extreme position only the tube 20.

The tube 20 extends at a right angle to the longitudinal axis of the sound tube 2 into the funnel extension 6 and on its inner end is fitted with a nozzle 23 connected thereto by an india rubber junction piece 24 so that the nozzle 23, which is made of magnetic material, can move at right angle to the tube 20. Above the metal nozzle 23 is arranged a permanent or electromagnet 25 which is mounted upon a diaphragm 26 that closes the lower end of a speaking tube 27. The tube 27 passes through the lid of the box 1 and is provided at its outer end with a mouth piece 28.

By means of an adjusting nut 29 or other device the speaking tube 27 can be raised or lowered and the magnet 25 be consequently moved away from the metal nozzle 23 or moved nearer thereto. Located in a container 30 and arranged beneath the nozzle 23 is a piece of soft iron 31 of the same size as the magnet 25 and which is mounted upon the end of a spring 32 inclosed in the container 30.

The operation of the improved transmitting apparatus is as follows: If signals are to be given, the siren S is set in motion and the connection of the tube 17 with the compressed air or vapor reservoir is alternately made and broken by manipulation of the cock 21. In this way intermittent sounds are produced by the siren, the pitch of which is dependent upon the number of revolutions of the revolving disk thereof. The air contained in the resonance box 13 vibrates in unison therewith and through the lateral opening 15 acts upon the air contained in the cylindrical extension 6 thereby causing the column of air contained in the sound tube 2 to vibrate in the direction of the axis of this tube. The air vibrations passing through the branch tube 14 simultaneously act upon the column of air contained in the tube 2 in a direction at right angles to its axis.

The vibrating column of air or vapor sets the water in the sound tube in vibration directly and not through a diaphragm, for if such water were to be set in vibration by air or vapor vibrations acting upon the upper side of a diaphragm the underside of which was in contact with the water, then the vibration on the one side of the diaphragm would be repelled on the other side by the denser medium, which is a disadvantage that is avoided in the construction shown.

The sound horn 4 conducts the sound waves for the greater part in the desired direction in which it is directed by the adjustment thereof at the time being, so that such waves can be picked up by a suitable receiver located at a distance. If, however, directly spoken sounds are to be transmitted through the water, the words are spoken into the mouth-piece 28 and compressed air or vapor is allowed to flow at the same time from the storage reservoir 18 into the tube 20 from which it issues through the metal nozzle 23.

By means of the magnet 25 vibrating with the diaphragm 26 the easily movable metal nozzle is repelled and attracted in rhythm with the vibrations produced by speaking into the tube 27, the otherwise disturbing individual vibrations of the india rubber tube 24 being damped by the magnetism induced in the piece of soft iron 31.

The compressed air or vapor issuing from the metal nozzle 23 sets the air contained in the sound tube and the water in analogous vibrations either as shown directly or through a suitably arranged diaphragm of appropriate material and such vibrations are sent out in the desired direction through the sound horn.

Claims:

1. In a transmitting apparatus for submarine signaling, a siren, a resonator in proximity thereto, a rotatable tube having a subaqueous outlet, said tube containing a body of water in communication with the water in which the sound is to be propagated, and means to transmit the sound waves generated in the resonator to the body of water in the tube.

2. In a transmitting apparatus for submarine signaling, a siren, a resonator in proximity thereto, a rotatable tube having a subaqueous outlet, a sound collecting funnel having a cylindrical part larger than the tube and at the upper end of the same, a port for communication between the resonator and said cylindrical part of the funnel and a second communication established between the resonator and the tube body.

3. In a transmitting apparatus for submarine signaling, a siren, a resonator in proximity to the siren, a tube having an upper stationary portion and a lower revoluble portion with a subaqueous outlet, said lower portion containing a body of water in communication with the surrounding water through the medium of said outlet and means to establish communication of the resonator with the stationary part of the tube at two points thereof.

4. In a transmitting apparatus for submarine signaling, a siren, a resonator in proximity thereto, a tube having an upper stationary portion and a lower revoluble portion with a subaqueous outlet, means to rotate the lower portion of the tube, said lower portion containing a body of water in communication with the surrounding water through the medium of said outlet, a sound collecting funnel having a cylindrical part larger than the tube positioned at the upper end of the stationary tube, a port for communication between the resonator and said cylindrical part, and a second tube to establish communication between the resonator and the body of the stationary tube.

In testimony that I claim the foregoing as my invention, I have signed my name in presence of two subscribing witnesses.

JOSEF SCHIESSLER.

Witnesses:
 JOSEF RUBASCH,
 AUGUST FUGGER.